United States Patent
Goel et al.

(10) Patent No.: US 12,500,580 B2
(45) Date of Patent: Dec. 16, 2025

(54) SYSTEM AND METHOD FOR VALIDATING CRITICAL PATHS OF INTEGRATED CIRCUITS

(71) Applicant: NXP B.V., Eindhoven (NL)

(72) Inventors: Ashish Goel, Noida (IN); Ajay Sharma, New Delhi (IN); Ruchi Bora, Lucknow (IN); Umesh Pratap Singh, Hodal (IN)

(73) Assignee: NXP B.V., Eindhoven (NL)

( * ) Notice: Subject to any disclaimer, the term of this patent is extended or adjusted under 35 U.S.C. 154(b) by 66 days.

(21) Appl. No.: 18/425,006

(22) Filed: Jan. 29, 2024

(65) Prior Publication Data

US 2025/0192756 A1 Jun. 12, 2025

(30) Foreign Application Priority Data

Dec. 12, 2023 (IN) .............................. 202341084715

(51) Int. Cl.
 *H03K 3/037* (2006.01)
 *H03K 5/00* (2006.01)
 *H03K 5/01* (2006.01)

(52) U.S. Cl.
 CPC ............... *H03K 3/037* (2013.01); *H03K 5/01* (2013.01); *H03K 2005/00013* (2013.01)

(58) Field of Classification Search
 CPC ........ G01R 31/31725; G01R 31/31726; G01R 31/3016; G01R 31/31727; G01R 31/318525; G01R 31/3187; G01R 31/31932; G01R 31/31922; G06F 1/3203; G06F 1/3237; G06F 11/1608; G06F 11/16; G06F 30/3312; G06F 11/00; G06F 11/0754; G06F 11/0757; H03K 3/356156; H03K 5/1534

See application file for complete search history.

(56) References Cited

U.S. PATENT DOCUMENTS

| | | | |
|---|---|---|---|
| 7,941,772 B2 | 5/2011 | Beuti et al. | |
| 9,536,625 B1 | 1/2017 | Quinton et al. | |
| 2008/0263489 A1 | 10/2008 | Canada et al. | |
| 2013/0088256 A1 | 4/2013 | Chlipala et al. | |
| 2023/0324949 A1* | 10/2023 | Massoudi | G01R 31/2884 714/30 |
| 2023/0384362 A1* | 11/2023 | Chang | G01R 31/2837 |

* cited by examiner

*Primary Examiner* — Lincoln D Donovan
*Assistant Examiner* — James G Yeaman

(57) ABSTRACT

A validation circuit is placed in vicinity of a critical path for testing the critical path. The validation circuit receives test data from the control circuit for testing the critical path. The test data is indicative of a delay value that is associated with the critical path. The validation circuit generates multiple setup signals and an enable signal to facilitate the testing of the critical path based on the test data. The validation circuit generates a first test signal based on the enable signal, and a second test signal based on the first test signal and the setup signals. The second test signal is a delayed version of the first test signal. The validation circuit compares the first test signal and the second test signal. A mismatch between the first test signal and the second test signal indicates deviation from the delay value.

18 Claims, 5 Drawing Sheets

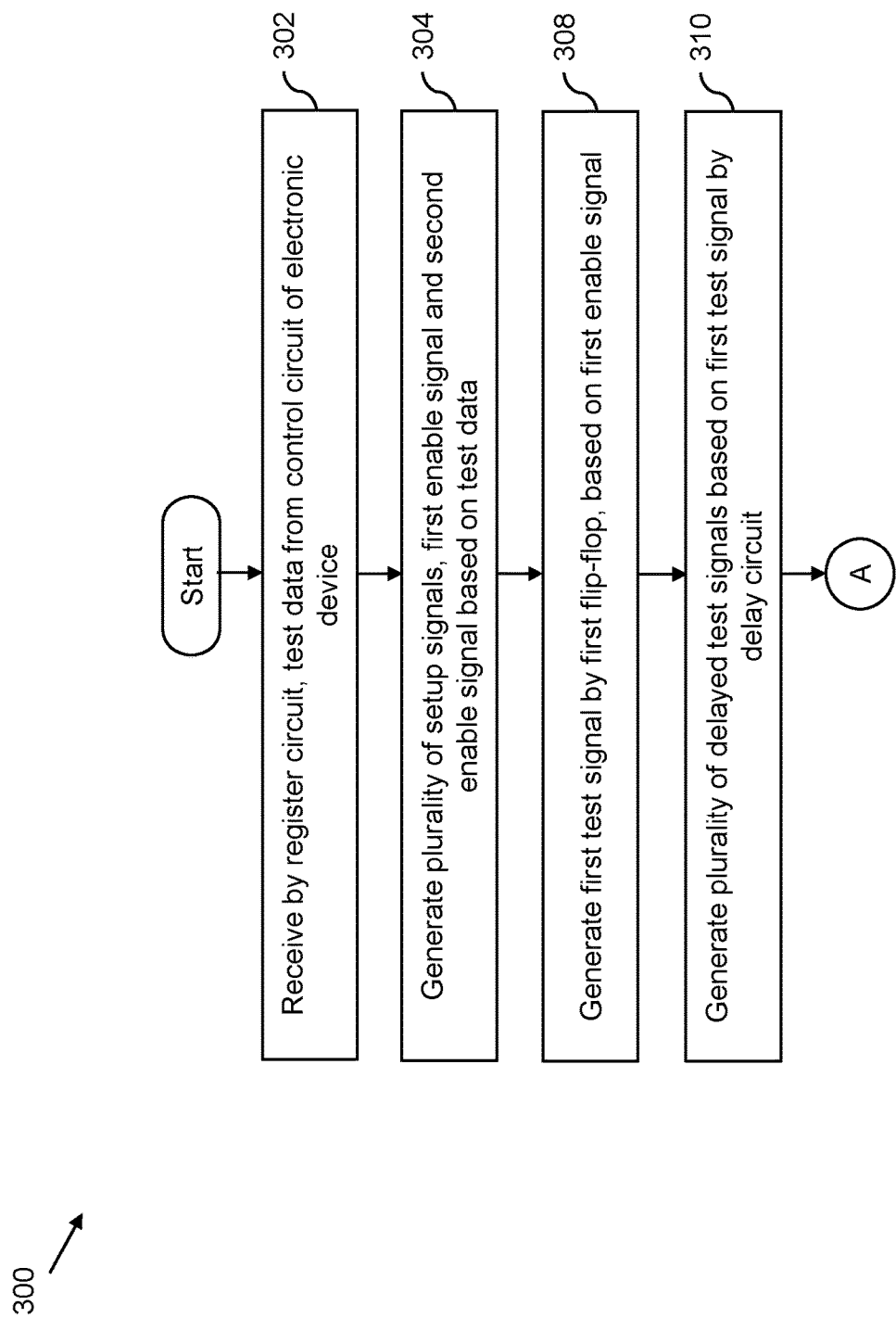

SYSTEM AND METHOD FOR VALIDATING CRITICAL PATHS OF INTEGRATED CIRCUITS

CROSS-REFERENCE TO RELATED APPLICATIONS

This application claims the priority under 35 U.S.C. § 119 of India patent application No. 202341084715, filed on 12 Dec. 2023, the contents of which are incorporated by reference herein.

FIELD OF USE

The present disclosure relates generally to electronic circuits and, more particularly, to a system and a method for validating critical paths of integrated circuits.

BACKGROUND

An integrated circuit (IC) includes various critical paths to couple components of the IC. A critical path may refer to a path that includes a sequence of components such that the critical path maximizes the delay of a signal traversing through the critical path. Critical paths of an IC are prone to delay due to aging effects, process variations, or the like. The delay associated with the critical paths leads to a delay in receiving input signals from the components of the critical path. Thus, validating such critical paths is essential. Conventional testing circuits to validate such critical paths utilize multiple patterns to excite a single critical path. Further, the conventional testing circuits fail to excite critical paths that are determined to be infeasible for excitation. Thus, such critical paths are left unvalidated.

BRIEF DESCRIPTION OF DRAWINGS

The following detailed description of the embodiments of the present disclosure will be better understood when read in conjunction with the appended drawings. The present disclosure is illustrated by way of example, and not limited by the accompanying figures, in which like references indicate similar elements.

FIGS. 3A-3C represents a flowchart that illustrates a validation method to validate a critical path of the electronic device of FIG. 1 in accordance with an embodiment of the present disclosure.

DETAILED DESCRIPTION

Figure 1:
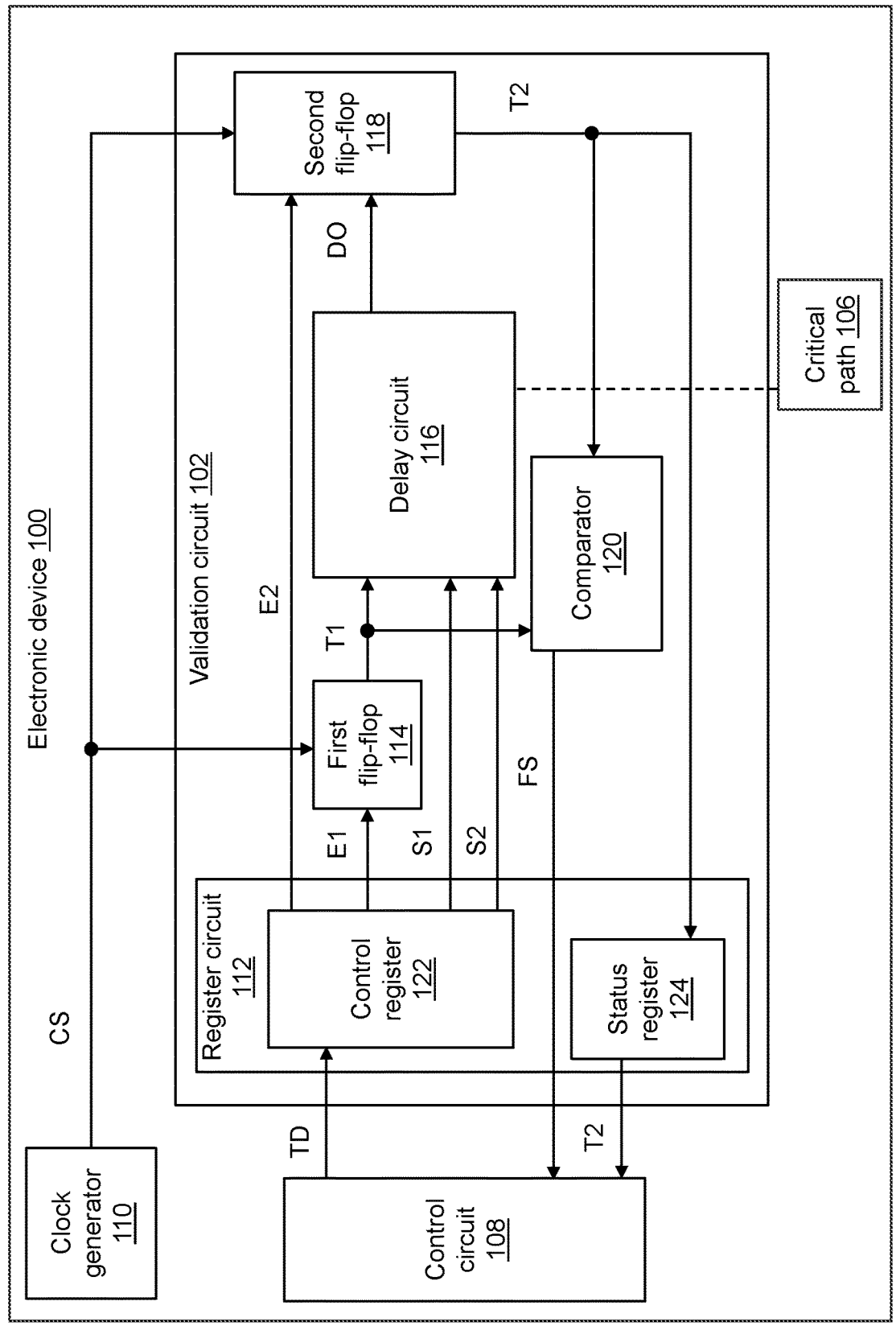
FIG. 1 illustrates a block diagram of an electronic device in accordance with an embodiment of the present disclosure.

The detailed description of the appended drawings is intended as a description of the embodiments of the present disclosure, and is not intended to represent the only form in which the present disclosure may be practiced. It is to be understood that the same or equivalent functions may be accomplished by different embodiments that are intended to be encompassed within the spirit and scope of the present disclosure.

Overview:

The validation of all critical paths of an integrated circuit (IC) is paramount to ensure that the IC executes a specific function in a desired manner. In an event that any of the critical paths are left invalidated, the safety of the IC may be compromised. Conventional testing circuits utilize labor-intensive processes such as writing multiple test patterns to excite a single critical path. Additionally, multiple test patterns are written for the remaining critical paths, thereby increasing the validation time of the critical paths. Conventional testing circuits further fail to validate critical paths that are determined to be infeasible for validation.

Various embodiments of the present disclosure disclose an electronic device that includes a validation circuit in a vicinity of a critical path of the electronic device. The validation circuit may provide a delay identical to a delay associated with the critical path based on identical exposure to or effects from various factors (e.g., aging, process variations, or the like). The validation circuit may include a register circuit, a delay circuit, a first flip-flop, a second flip-flop, and a comparator. The register circuit may receive test data from a control circuit of the electronic device. The test data may indicate the delay value associated with the critical path. Further, the register circuit may generate setup signals based on the reception of the test data. The delay circuit may receive the setup signals based on the delay value from the register circuit. The delay circuit may be configured with the delay value. Further, the first flip-flop may generate a test signal based on an enable signal generated by the register circuit. The delay circuit may further delay the test signal based on the delay value to generate a delay output signal. The second flip-flop may generate another test signal based on the delay output signal.

The comparator may compare the two test signals from the first flip-flop and the second flip-flop. The comparator may toggle a fault signal to indicate a mismatch between the two test signals. Additionally, the comparator may provide the fault signal to the control circuit. Based on the reception of the fault signal, the control circuit may detect a deviation from the delay value.

Thus, the technique of validating the critical path of the present disclosure implements a simple design for validation by utilizing the delay circuit, the register circuit, the first flip-flop, and the second flip-flop. The validation circuit may be further able to test critical paths on a single IC of the electronic device that are determined to be infeasible to excite by conventional testing circuits. Further, in scenarios where the IC may include multiple critical paths in the vicinity of each other, the validation circuit may validate one of the critical paths that provides maximum delay as compared to other critical paths. The validation of the critical path with maximum delay in turn validates the other critical paths of the IC. Thus, multiple critical paths are validated simultaneously by the validation circuit. The validation circuit may further test the critical paths without interrupting the functionality of the critical path. Thus, the normal functionality of the electronic device remains unaffected during validation. Additionally, when the fault signal toggles, the electronic device may transition into a safe state. In a safe state, the electronic device may execute control shutdown or reduced efficiency of operation involving the critical path to ensure that further operations of the electronic device remain unaffected. The present disclosure may further enable the control circuit to be coupled to multiple validation circuits and may provide each validation circuit, test data to validate the delay of the respective critical path. Further, the validation of all the critical paths of the electronic device is executed in a similar manner and eliminates the need for utilizing multiple test patterns to test a single critical path.

FIG. 1 illustrates a block diagram of an electronic device 100 in accordance with an embodiment of the present disclosure. The electronic device 100 may include a validation circuit 102 that may be utilized for validating a critical path 106 of the electronic device 100. The electronic device 100 may be an automotive device, a mobile device, or the like. The electronic device 100 may further include a control circuit 108 and a clock generator 110. The validation circuit 102 and the critical path 106 may be included on an integrated circuit (IC) (not shown).

Critical Path 106:

To ensure that the electronic device 100 is operating in a desired (e.g., normal) manner, the electronic device 100 may be tested by testing (e.g., validating) critical paths such as the critical path 106, of the electronic device 100. The critical path 106 may refer to a path that includes a sequence of components (not shown) of the electronic device 100 such that the critical path 106 may provide a maximum delay of a signal traversing through the critical path 106. The testing of the critical path 106 is explained in the ongoing description.

Control Circuit 108:

The control circuit 108 may be included in the electronic device 100 to enable the testing of the critical path 106. The control circuit 108 may be coupled to the validation circuit 102. The control circuit 108 may include suitable circuitry that may be configured to perform one or more operations. For example, the control circuit 108 may be configured to provide test data TD to the validation circuit 102. The test data TD may be an expected delay value (e.g., a normal delay value) associated with the critical path 106 under normal operating conditions of the electronic device 100. In other words, the delay value may be set based on an expected delay associated with the components on the critical path 106 when data is provided to various components of the electronic device 100 by way of the critical path 106. The control circuit 108 may be further configured to receive a fault signal FS from the validation circuit 102 based on the test data TD. The control circuit 108 may be further configured to determine the status of the testing of the critical path 106 based on the fault signal FS. Examples of the control circuit 108 may include, but are not limited to, an application-specific integrated circuit (ASIC) processor, a complex instruction set computer (CISC) processor, a central processing unit (CPU), or the like.

Validation Circuit 102:

The validation circuit 102 may be in a vicinity of the critical path 106. For example, the validation circuit 102 may be in the vicinity of 2 millimeters (mm) of the critical path 106. The validation circuit 102 is placed in the vicinity of the critical path 106 such that the effect of aging and a plurality of other factors such as physical damage, wear tear and tear, manufacturing defects, environmental contaminants, or the like on the validation circuit 102 may be similar as compared to that on the critical path 106. The validation circuit 102 may include suitable circuitry that may be configured to perform one or more operations. For example, the validation circuit 102 may test (e.g., validate) the critical path 106. The validation circuit 102 may be coupled to the control circuit 108 and the clock generator 110. The validation circuit 102 may include a register circuit 112, a first flip-flop 114, a delay circuit 116, a second flip-flop 118, and a comparator 120.

Register Circuit 112:

The register circuit 112 may be coupled to the control circuit 108, the first flip-flop 114, the delay circuit 116, and the second flip-flop 118. The register circuit 112 may be configured to receive the test data TD from the control circuit 108. Further, the register circuit 112 may be configured to generate a plurality of setup signals S1-S2 associated with the delay value, a first enable signal E1, and a second enable signal E2. In an example, the first enable signal E1 and the second enable signal E2 may be a logic low signal. In another example, the first enable signal E1 and the second enable signal E2 may be a logic high signal. The plurality of setup signals S1-S2 may include a first setup signal S1 and a second setup signal S2. The register circuit 112 may be further configured to provide a second test signal T2 to the control circuit 108. The register circuit 112 may include a control register 122 and a status register 124. In an embodiment, the control register 122 and the status register 124 may be a data register.

Control Register 122:

The control register 122 may be coupled to the control circuit 108, the first flip-flop 114, the delay circuit 116, and the second flip-flop 118. The control register 122 may include suitable circuitry that may be configured to perform one or more operations. For example, the control register 122 may be configured to receive the test data TD from the control circuit 108. The control register 122 may be further configured to generate, based on the test data TD, the plurality of setup signals S1-S2 associated with the delay value, the first enable signal E1, and the second enable signal E2.

The status register 124 may include suitable circuitry that may be configured to perform one or more operations. The status register 124 has been explained later in detail.

First Flip-Flop 114:

The first flip-flop 114 may be coupled to the register circuit 112, the clock generator 110, and the delay circuit 116. In particular, the first flip-flop 114 may be coupled to the control register 122 of the register circuit 112. In an embodiment, the first flip-flop 114 may be a D flip-flop. The first flip-flop 114 may include an input terminal, a clock terminal, and an output terminal. The input terminal of the first flip-flop 114 may be coupled to the register circuit 112 (e.g., the control register 122). The input terminal of the first flip-flop 114 may be configured to receive the first enable signal E1 from the register circuit 112 (e.g., the control register 122). The clock terminal of the first flip-flop 114 may be coupled to the clock generator 110. The clock terminal of the first flip-flop 114 may be configured to receive a first clock signal CS from the clock generator 110. Further, the output terminal of the first flip-flop 114 may be coupled to the delay circuit 116. The output terminal of the first flip-flop 114 may be configured to generate a first test signal T1 and provide the first test signal T1 to the delay circuit 116.

Delay Circuit 116:

The delay circuit 116 may be coupled to the first flip-flop 114, the second flip-flop 118, and the control register 122. The delay circuit 116 may be configured to receive the plurality of setup signals S1-S2 from the control register 122. Upon receiving the plurality of setup signals S1-S2, the delay circuit 116 may be configured with the delay value. The delay circuit 116 may be further configured to receive the first test signal T1, based on the first enable signal E1, from the first flip-flop 114. The delay circuit 116 may be further configured to delay the first test signal T1 based on the configuration of the delay circuit 116 with the delay value, and generate a delay output signal DO. The delay output signal DO may be a delayed version of the first test signal T1. In an embodiment, the delay circuit 116 may be in the vicinity (shown by way of a dotted line in FIG. 1) of the critical path 106 as compared to remaining components of the validation circuit 102. The delay circuit 116 has been explained in detail in FIG. 2.

Second Flip-Flop 118:

The second flip-flop 118 may be coupled to the delay circuit 116, the clock generator 110, and the register circuit 112. In particular, the second flip-flop 118 may be coupled to the control register 122 and the status register 124 of the register circuit 112. In an embodiment, the second flip-flop 118 may be a D flip-flop. The second flip-flop 118 may include a first input terminal, a second input terminal, a clock terminal, and an output terminal. The first input terminal of the second flip-flop 118 may be coupled to the register circuit 112 (e.g., the control register 122). The first input terminal of the second flip-flop 118 may be configured to receive the second enable signal E2 from the register circuit 112 (e.g., the control register 122). The second input terminal of the second flip-flop 118 may be coupled to the delay circuit 116. The second input terminal of the second flip-flop 118 may be configured to receive the delay output signal DO from the delay circuit 116. The clock terminal of the second flip-flop 118 may be coupled to the clock generator 110. The clock terminal of the second flip-flop 118 may be configured to receive the first clock signal CS from the clock generator 110. Further, the output terminal of the second flip-flop 118 may be coupled to the status register 124. The output terminal of the second flip-flop 118 may be configured to generate a second test signal T2 and provide the second test signal T2 to the status register 124 and the comparator 120.

Comparator 120:

The comparator 120 may be coupled to the control circuit 108, the first flip-flop 114, and the second flip-flop 118. The comparator 120 may be configured to receive the first test signal T1 and the second test signal T2 from the output terminal of the first flip-flop 114 and the output terminal of the second flip-flop 118, respectively. The comparator 120 may be further configured to compare the first test signal T1 and the second test signal T2. The comparator 120 may be further configured to generate the fault signal FS. The fault signal FS may toggle (e.g., toggle from a logic low state to a logic high state or a logic high state to a logic low state), based on the mismatch between the first test signal T1 and the second test signal T2. The mismatch between the first test signal T1 and the second test signal T2 may indicate a mismatch of data associated with the first test signal T1 and the second test signal T2. The mismatch of data associated with the first test signal T1 and the second test signal T2 may be indicative of deviation from the delay value. In an example, the mismatch of data associated with the first test signal T1 and the second test signal T2 may occur due to the first test signal T1 being a logic high signal and the second test signal T2 being a logic low signal. The deviation from the delay value may be associated with the critical path 106. Further, the deviation from the delay value may occur due to one of effects of aging on the critical path 106 and effects of process variation on the critical path 106. Based on a match between the first test signal T1 and the second test signal T2, the fault signal FS may remain in a same state as a previous state or a current state (e.g., a logic low state or a logic high state). Further, the match between the first test signal T1 and the second test signal T2 may be indicative of a normal delay associated with the critical path 106 such that the normal delay may be within an acceptable range of the delay value. An example of the acceptable range of the delay value may be within 5 milliseconds (ms) of the delay value. In the example, the delay value may be 20 ms and the acceptable range may be within 5 ms of the delay value. In an event of a mismatch of data associated with the second test signal T2 and the first test signal T1, the deviation of the delay value associated with the critical path 106 may be within the range of 10 ms to 30 ms whereas, in an event of a match between the second test signal T2 and the first test signal T1, the delay value associated with the critical path 106 may be within the range of 15 ms to 25 ms. Examples of the comparator 120 may include, but are not limited to, a digital comparator, a voltage comparator, or the like.

Aging effects on the critical path 106 may be due to aging effects in the electronic device 100 and may be associated with the gradual deterioration of the electrical and physical characteristics of components over time, thereby affecting the performance of the electronic device 100. The aging effects may further be influenced by environmental elements such as temperature, voltage, and usage of the electronic device 100. Process variation of the critical path 106 may refer to non-uniform deviations in the fabrication of the electronic device 100. Non-uniform deviations may be physical damage or the like. The deviations may result in changes in the electrical and physical characteristics of the components of the electronic device 100 thereby affecting a delay associated with the critical path 106.

Status Register 124:

The status register 124 may be coupled to the control circuit 108 and the second flip-flop 118. The status register 124 may be coupled to the output terminal of the second flip-flop 118. The status register 124 may be configured to receive the second test signal T2 from the output terminal of the second flip-flop 118. The status register 124 may be further configured to store data associated with the second test signal T2 based on the reception of the second test signal T2. The status register 124 may be further configured to provide the second test signal T2 to the control circuit 108.

Referring back to the control circuit 108, the control circuit 108 may be further configured to receive the second test signal T2 and the fault signal FS. As the fault signal FS may toggle based on the mismatch between the first test signal T1 and the second test signal T2, the toggling of the fault signal FS may act as an interrupt for the control circuit 108. In an example, if a current state of the fault signal FS is a logic low state, the fault signal FS may toggle from the logic low state to a logic high state based on the mismatch. In another example, if the current state of the fault signal FS is a logic high state, the fault signal FS may toggle from the logic high state to the logic low state based on the mismatch. The control circuit 108 may be further configured to transition from an active state to a safe state based upon the toggling of the fault signal FS and the second test signal T2. In the safe state, the electronic device 100 may execute a controlled shutdown or reduced efficiency of operation involving the critical path 106 to ensure that further operations of the electronic device 100 may remain unaffected. In the absence of toggling of the fault signal FS, the control circuit 108 may remain in the active state and may detect that the critical path 106 is functioning normally. Further, the control circuit 108 may generate additional test data for testing an alternate critical path (not shown) of the electronic device 100.

Clock Generator 110:

The clock generator 110 may include suitable circuitry that may be configured to perform one or more operations. For example, the clock generator 110 may be configured to generate the first clock signal CS. Examples of the clock generator 110 may include a crystal oscillator, a voltage-controlled crystal oscillator, a phase-locked loop clock generator, or the like.

Though it is shown that, the electronic device 100 includes the critical path 106, the scope of the disclosure is not limited to it. It will be understood by a person skilled in the art that, the electronic device 100 may include multiple critical paths and multiple validation circuits and the control circuit 108 may be configured to test all such critical paths through such validation circuits.

Figure 2:
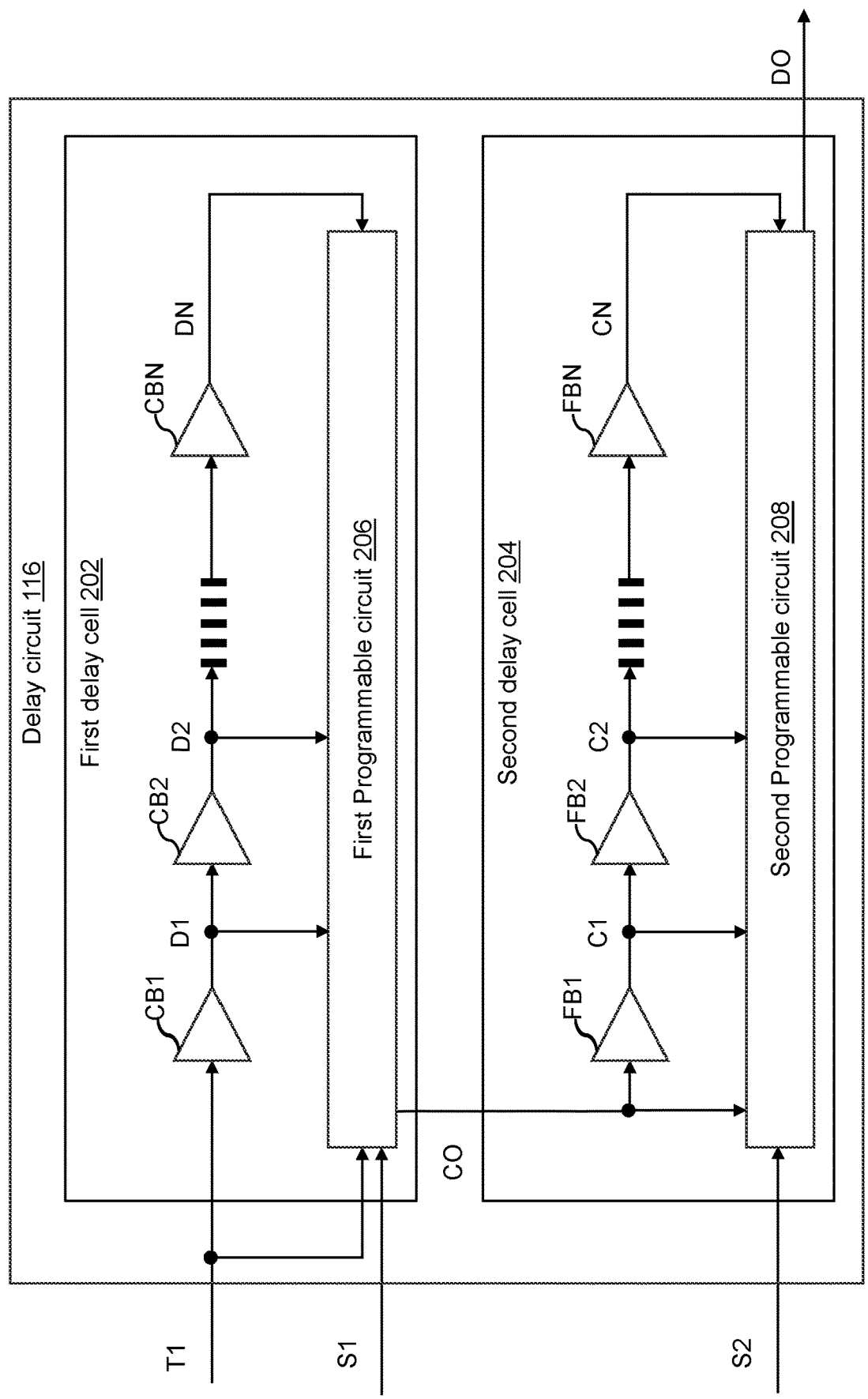
FIG. 2 illustrates a schematic block diagram of a delay circuit of the electronic device in accordance with an embodiment of the present disclosure.

FIG. 2 illustrates a schematic block diagram of the delay circuit 116 of the electronic device 100 in accordance with an embodiment of the present disclosure The delay circuit 116 may include a first delay cell 202 and a second delay cell 204.

First Delay Cell 202:

The first delay cell 202 may be coupled to the first flip-flop 114 and the control register 122 of the register circuit 112. The first delay cell 202 may be configured to receive the first setup signal S1 of the plurality of setup signals S1-S2 from the control register 122 of the register circuit 112. The first setup signal S1 may be indicative of a first value of the delay value. The first delay cell 202 may be configured with the first value. The configuration of the first delay cell 202 with the first value is indicative of an amount of delay provided by the first delay cell 202 to the first test signal T1. The first delay cell 202 may be further configured to receive the first test signal T1 from the output terminal of the first flip-flop 114. The first delay cell 202 may be further configured to generate a plurality of delayed test signals D1-DN based on the delaying of the first test signal T1 by the first value. The first delay cell 202 may be further configured to output a coarse delay signal CO based on the first value. The coarse delay signal CO may include one of the first test signal T1 and a delayed test signal of the plurality of delayed test signals D1-DN. Based on the coarse delay signal CO, the delay circuit 116 may generate the delay output signal DO.

The first delay cell 202 may include a plurality of coarse buffers CB1-CBN, and a first programmable circuit 206. The plurality of coarse buffers CB1-CBN may include a first coarse buffer CB1, a second coarse buffer CB2, . . . , and an $n^{th}$ coarse buffer CBN. In an embodiment, each of the plurality of coarse buffers CB1-CBN may be a voltage buffer. Further, each of the plurality of coarse buffers CB1-CBN may be a delay buffer.

The plurality of coarse buffers CB1-CBN may be coupled in series. The plurality of coarse buffers CB1-CBN may be configured to generate the plurality of delayed test signals D1-DN. For example, the plurality of coarse buffers CB1-CBN may be configured to generate the plurality of delayed test signals D1-DN such that each coarse buffer may generate a corresponding delayed test signal. Each delayed test signal of the plurality of delayed test signals D1-DN may be a delayed version of the first test signal T1. Further, each coarse buffer of the plurality of coarse buffers CB1-CBN may include an input terminal and an output terminal.

The input terminal of the first coarse buffer CB1 may be coupled to the output terminal of the first flip-flop 114. The input terminal of the first coarse buffer CB1 may be configured to receive the first test signal T1 from the output terminal of the first flip-flop 114. Further, as the plurality of coarse buffers CB1-CBN may be coupled in series, the input terminal of a second coarse buffer CB2 may be coupled to the output terminal of the first coarse buffer CB1. In other words, the input terminal of each remaining coarse buffer (e.g., second through $n^{th}$ coarse buffers CB2-CBN) may be coupled to an output terminal of a preceding coarse buffer.

The output terminal of the first coarse buffer CB1 may be configured to generate a first delayed test signal D1 of the plurality of delayed test signals D1-DN. The first delayed test signal D1 may be generated based on the first test signal T1 and a delay value of the first coarse buffer CB1. Further, the output terminal of each of the second through nth coarse buffers CB2-CBN may be configured to generate the corresponding delayed test signal of the plurality of delayed test signals D1-DN. Thus, the second coarse buffer CB2 may generate a second delayed test signal D2 based on the first delayed test signal D1 and a delay value of the second coarse buffer CB2. Similarly, the nth coarse buffer CBN may generate an Nth delayed test signal DN. In one or more embodiments, the delay provided by each of the plurality of coarse buffers CB1-CBN may be identical in nature. In another embodiment, each of the plurality of coarse buffers CB1-CBN may provide an incremental delay as compared to a previous coarse buffer in the series.

First Programmable Circuit 206:

The first programmable circuit 206 may be coupled to the first flip-flop 114, the plurality of coarse buffers CB1-CBN, and the control register 122 of the register circuit 112. The first programmable circuit 206 may be configured to output the coarse delay signal CO. In an embodiment, the first programmable circuit 206 may be a multiplexer. The first programmable circuit 206 may include a first plurality of input terminals, a first select terminal, and an output terminal. The first programmable circuit 206 may be configured with the first value associated with the first setup signal S1 received from the control register 122 of the register circuit 112. The first value may be based on the delay value. The first programmable circuit 206 may be further configured to select one of the first test signal T1 and a delayed test signal of one of the plurality of delayed test signals D1-DN as the coarse delay signal CO based on the first value. In other words, the first value may indicate a selection of one of the first test signal T1 and one of the plurality of delayed test signals D1-DN.

A first input terminal of the first plurality of input terminals may be coupled to the output terminal of the first flip-flop 114. The first input terminal may be configured to receive the first test signal T1 from the output terminal of the first flip-flop 114. Further, each of the remaining input terminals of the first plurality of input terminals may be coupled to an output terminal of a first plurality of output terminals of the plurality of coarse buffers CB1-CBN. Each of the remaining input terminals of the first plurality of input terminals may be configured to receive one of the plurality of delayed test signals D1-DN. The first select terminal may be coupled to the control register 122 of the register circuit 112. The first select terminal may be configured to receive the first setup signal S1 from the control register 122 of the register circuit 112. The first setup signal S1 may be indicative of the first value. The first select terminal may be configured to select one of the first test signal T1 and a delayed test signal of the plurality of delayed test signals D1-DN based on the first value. In an example, the first test signal T1 may be outputted as the coarse delay signal CO when the first value is indicative of zero delay. In another example, one of the plurality of delayed test signals D1-DN may be outputted as the coarse delay signal CO based on the delay value indicated by the first value. Further, the output terminal of the first programmable circuit 206 may be coupled to the second delay cell 204. The output terminal may be configured to output the coarse delay signal CO and provide the coarse delay signal CO to the second delay cell 204 based on the selection of one of the first test signal T1 and the delayed test signal.

Second Delay Cell 204:

The second delay cell 204 may be coupled to the first delay cell 202 and the control register 122 of the register circuit 112. The second delay cell 204 may be configured to receive the second setup signal S2 of the plurality of setup signals S1-S2 from the control register 122 of the register circuit 112. The second setup signal S2 may be indicative of a second value of the delay value. The second delay cell may be configured with the second value. The second delay cell 204 may be further configured to receive the coarse delay signal CO from the first delay cell 202 (e.g., the output terminal of the first programmable circuit 206). The second delay cell 204 may be further configured to generate a plurality of delayed coarse signals C1-CN based on the delaying of the coarse delay signal CO. The second delay cell 204 may be further configured to output the delay output signal DO. The delay output signal DO is one of the coarse delay signal CO and one of the plurality of delayed coarse signals C1-CN. Based on the delay output signal DO, the second test signal T2 may be generated by the second flip-flop 118.

The second delay cell 204 may include a plurality of fine buffers FB1-FBN, and a second programmable circuit 208. The plurality of fine buffers FB1-FBN may include a first fine buffer FB1, a second fine buffer FB2, . . . , and an $n^{th}$ fine buffer FBN. In an embodiment, each of the plurality of fine buffers FB1-FBN may be a voltage buffer. Further, each of the plurality of fine buffers FB1-FBN may be a delay buffer.

The plurality of fine buffers FB1-FBN may be coupled in series. The plurality of fine buffers FB1-FBN may be configured to generate the plurality of delayed coarse signals C1-CN. For example, the plurality of fine buffers FB1-FBN may be configured to generate the plurality of delayed coarse signals C1-CN such that each fine buffer may generate a corresponding delayed coarse signal. Each delayed coarse signal of the plurality of delayed coarse signals C1-CN may be a delayed version of the coarse delay signal CO. Further, each fine buffer of the plurality of fine buffers FB1-FBN may include an input terminal and an output terminal.

The input terminal of the first fine buffer FB1 may be coupled to the first delay cell 202 (e.g., the output terminal of the first programmable circuit 206). The input terminal of the first fine buffer FB1 may be configured to receive the coarse delay signal CO from the output terminal of the first programmable circuit 206. Further, the plurality of fine buffers FB1-FBN may be coupled in series such that the input terminal of a second fine buffer FB2 may be coupled to the output terminal of the first fine buffer FB1. In other words, the input terminal of each remaining fine buffer (e.g., second through $n^{th}$ fine buffers FB2-FBN) may be coupled to an output terminal of a preceding fine buffer.

The output terminal of the first fine buffer FB1 may be configured to generate a first delayed coarse signal C1 of the plurality of delayed coarse signals C1-CN. Further, the output terminal of each of the second through nth fine buffers FB2-FBN may be configured to generate the corresponding delayed coarse signal of the plurality of delayed coarse signals C1-CN. Each of the plurality of delayed coarse signals C1-CN may be the delayed version of the coarse delay signal CO. Thus, the second fine buffer FB2 may generate a second delayed coarse signal C2 based on the first delayed coarse signal C1 and a delay value of the second fine buffer FB2. Similarly, the nth fine buffer FBN may generate an Nth delayed coarse signal CN.

In one or more embodiments, the delay provided by each of the plurality of fine buffers FB1-FBN is identical. In another embodiment, the delay provided by each of the plurality of fine buffers FB1-FB2 may be identical to the delay provided by each of the plurality of coarse buffers CB1-CBN. In yet another embodiment, each of the plurality of fine buffers FB1-FBN may provide an incremental delay as compared to a previous fine buffer in the series.

Second Programmable Circuit 208:

The second programmable circuit 208 may be coupled to the first delay cell 202, the plurality of fine buffers FB1-FBN, and the register circuit 112. In particular, the second programmable circuit 208 may be coupled to the control register 122 of the register circuit 112. In an embodiment, the second programmable circuit 208 may be a multiplexer. The second programmable circuit 208 may be configured to output the delay output signal DO. The second programmable circuit 208 may include a second plurality of input terminals, a second select terminal, and an output terminal. The second programmable circuit 208 may be configured with the second value associated with the second setup signal S2 received from the control register 122 of the register circuit 112. The second value may be based on the delay value. The second programmable circuit 208 may be further configured to select one of the coarse delay signal CO and a delayed coarse signal of the plurality of delayed coarse signals C1-CN as the delay output signal DO based on the second value. In other words, the second value may indicate a selection of one of the coarse delay signal CO and the plurality of delayed coarse signals C1-CN.

A first input terminal of the second plurality of input terminals may be coupled to the first delay cell 202 (e.g., the output terminal of the first programmable circuit 206). The first input terminal may be configured to receive the coarse delay signal CO from the output terminal of the first programmable circuit 206. Each of the remaining input terminals of the second plurality of input terminals may be coupled to an output terminal of the second plurality of output terminals. Further, each of the remaining input terminals of the second plurality of input terminals may be configured to receive one of the plurality of delayed coarse signals C1-CN. The second select terminal may be coupled to the control register 122 of the register circuit 112. The second select terminal may be configured to receive the second setup signal S2 from the control register 122. The second setup signal S2 may be indicative of the second value. The second select terminal may be configured to select one of the coarse delay signal CO and a delayed coarse signal from the plurality of delayed coarse signals C1-CN. In an embodiment, the selection of the coarse delay signal CO may be indicative of zero delay associated with the second delay cell 204. Further, the output terminal of the second programmable circuit 208 may be coupled to the second flip-flop 118. The output terminal may be configured to output the delay output signal DO and provide the delay output signal DO to the second flip-flop 118 based on the selection of one of the coarse delay signal CO and the delayed coarse signal.

In Operation:

The control circuit 108 may provide the test data TD to the control register 122 of the validation circuit 102. The test data TD is indicative of the normal delay value that may be associated with the critical path 106. In an exemplary scenario, the delay value associated with the critical path 106 is 21 ms. The control register 122 may generate the plurality of setup signals S1-S2 based on the delay value (e.g., 21 ms). The control circuit 108 may further generate the first enable signal E1 and the second enable signal E2.

The input terminal of the first flip-flop 114 may receive the first enable signal E1 from the control register 122. The clock terminal of the first flip-flop 114 may receive the first clock signal CS from the clock generator 110. The output terminal of the first flip-flop 114 may generate the first test signal T1.

The first delay cell 202 of the delay circuit 116 may receive the first test signal T1 from the first flip-flop 114. The first delay cell 202 may output the coarse delay signal CO based on the first setup signal S1. The first setup signal S1 is indicative of the first value of the delay value.

The first delay cell 202 may include the first coarse buffer CB1, the second coarse buffer CB2, . . . , and the nth fine buffer CBN connected in a series configuration such that a delay of 10 ms is introduced to an output of the previous coarse buffer. In other words, the first coarse buffer CB1 may generate the first delayed test signal D1 to introduce delay of 10 ms to the first test signal T1, the second coarse buffer CB2 may generate the second delayed test signal D2 to introduce delay of 20 ms to the first test signal T1, . . . , and the nth coarse buffer CBN may generate the nth delayed test signal DN to introduce delay of N times 10 (e.g., N*10) ms to the first test signal T1.

The first plurality of input terminals of the first programmable circuit 206 may receive the first test signal T1, the first delayed test signal D1, the second delayed test signal D2, . . . , and the nth delayed test signal DN. Further, the first select terminal may receive the first setup signal S1 from the control register 122. The first setup signal S1 may be indicative of the first value (e.g., 20 ms) of the delay value. The first select terminal may select the second coarse buffer CB2 based on the first setup signal S1 as the second coarse buffer CB2 delays the first test signal T1 by 20 ms to generate the second delayed test signal D2. The output terminal of the first programmable circuit 206 may output the second delayed test signal D2 as the coarse delay signal CO such that the delay generated by the first delay cell 202 is 20 ms based on the first setup signal S1.

The second delay cell 204 of the delay circuit 116 may receive the coarse delay signal CO. The second delay cell 204 may output the delay output signal DO based on the second setup signal S2. The second setup signal S2 is indicative of the second value of the delay value. The second delay cell 204 may include the first fine buffer FB1, the second fine buffer FB2, . . . , and the nth fine buffer FBN connected in a series configuration such that a delay of 1 millisecond is introduced to an output of the previous fine buffer. In other words, the first fine buffer FB1 may generate the first delayed coarse signal C1 to introduce a delay of 1 millisecond to the coarse delay signal CO, the second fine buffer FB2 may generate the second delayed coarse signal C2 to introduce a delay of 2 ms to the coarse delay signal CO, . . . , and the nth fine buffer FBN may generate the nth delayed coarse signal CN to introduce a delay of N ms to the coarse delay signal CO.

The second plurality of input terminals of the second programmable circuit 208 may receive the coarse delay signal CO, the first delayed coarse signal C1, the second delayed coarse signal C2, . . . , and the nth delayed coarse signal CN. Further, the second select terminal may receive the second setup signal S2 from the control register 122. The second setup signal S2 may be indicative of the second value (e.g., 1 millisecond) of the delay value. The second select terminal may select the first fine buffer FB1 based on the second setup signal S2 as the first fine buffer FB1 delays the coarse delay signal CO by 1 millisecond to generate the first delayed coarse signal C1. The output terminal of the second programmable circuit 208 may output the first delayed coarse signal C1 as the delay output signal DO such that the total delay generated by the delay circuit 116 is 21 ms.

The first input terminal of the second flip-flop 118 may receive the second enable signal E2 from the control register 122. The second input terminal of the second flip-flop 118 may receive the delay output signal DO. The clock terminal of the second flip-flop 118 may receive the first clock signal CS from the clock generator 110. The output terminal of the second flip-flop 118 may generate the second test signal T2.

The comparator 120 may receive the first test signal T1 and the second test signal T2 from the output terminal of the first flip-flop 114 and the output terminal of the second flip-flop 118, respectively. The comparator 120 may generate the fault signal FS. In a scenario, the comparison between the first test signal T1 and the second test signal T2 is indicative of a match. Based on the match between the first test signal T1 and the second test signal T2, the fault signal FS may remain in the same state. Further, the match between the first test signal T1 and the second test signal T2 may be indicative of a normal delay associated with the critical path 106. The normal delay is within an acceptable range of the delay value. The delay provided by the critical path 106 may be 21 ms. The control circuit 108 may remain in the active state and may detect that the critical path 106 is functioning normally. Further, the control circuit 108 may generate another test data for testing a different critical path (not shown) of the electronic device 100.

The status register 124 may receive the second test signal T2 from the second flip-flop 118 and store the data associated with the second test signal T2. The status register 124 may provide the second test signal T2 to the control circuit 108.

In another scenario, the comparison between the first test signal T1 and the second test signal T2 is indicative of a mismatch. The mismatch between the first test signal T1 (generated based on the first enable signal E1) and the second test signal T2 (generated based on the delay output signal DO and the delay associated with the test data TD) may thus be indicative of deviation from the delay value associated with the critical path 106. The deviation from the delay value may occur due to at least one of incorrect configuration of the first delay cell 202 with the first value or the second delay cell 204 with the second value, insufficient delay provided by at least one of the plurality of coarse buffers CB1-CBN or the plurality of fine buffers FB1-FBN, deviation from normal functioning of at least one of the first flip-flop 114, the delay circuit 116, and the second flip-flop 118, or the like. The aforesaid causes of deviation may further occur due to the effects of aging and process variations. Thus, the deviation from the delay value may be indicative of one of the aging effects on the critical path 106 and the effects of process variation on the electronic device 100 (e.g., the critical path 106). The fault signal FS may thus toggle due to the mismatch between the first test signal T1 and the second test signal T2. In an example, the deviation from the delay value may be 15 ms. The control circuit 108 may detect the deviation from the delay value based on the toggling of the fault signal FS. In an embodiment, the toggling of the fault signal FS may be indicative of an interrupt to the control circuit 108. Further, the control circuit 108 may transition from the active state to the safe state based on the toggling of the fault signal FS and the second test signal T2. During the safe state, the electronic device 100 may execute a controlled shutdown or operate at reduced efficiency for operations involving the critical path 106 to ensure that further operations of the electronic device 100 remain unaffected.

Figure 3B:
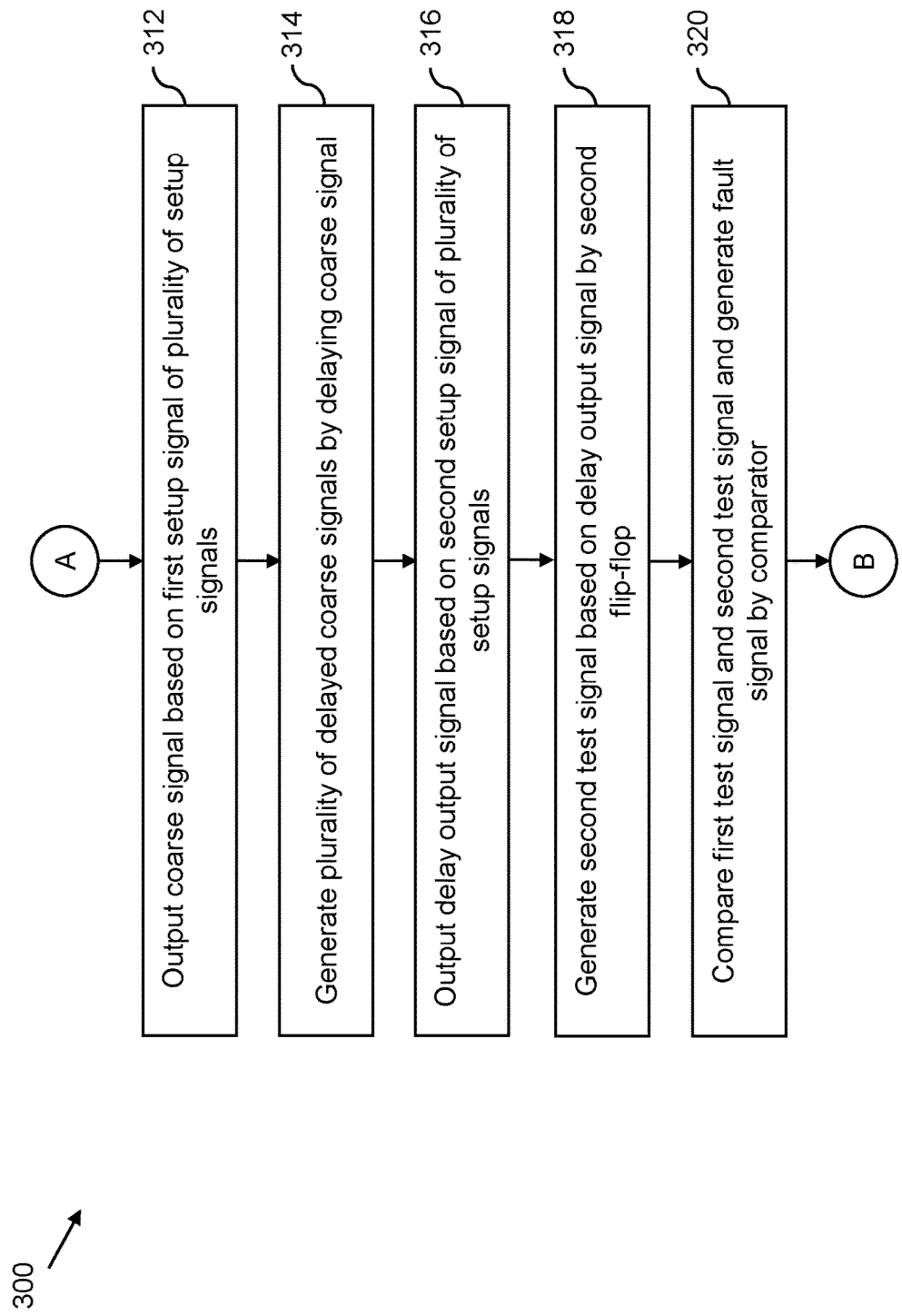
Figure 3C:
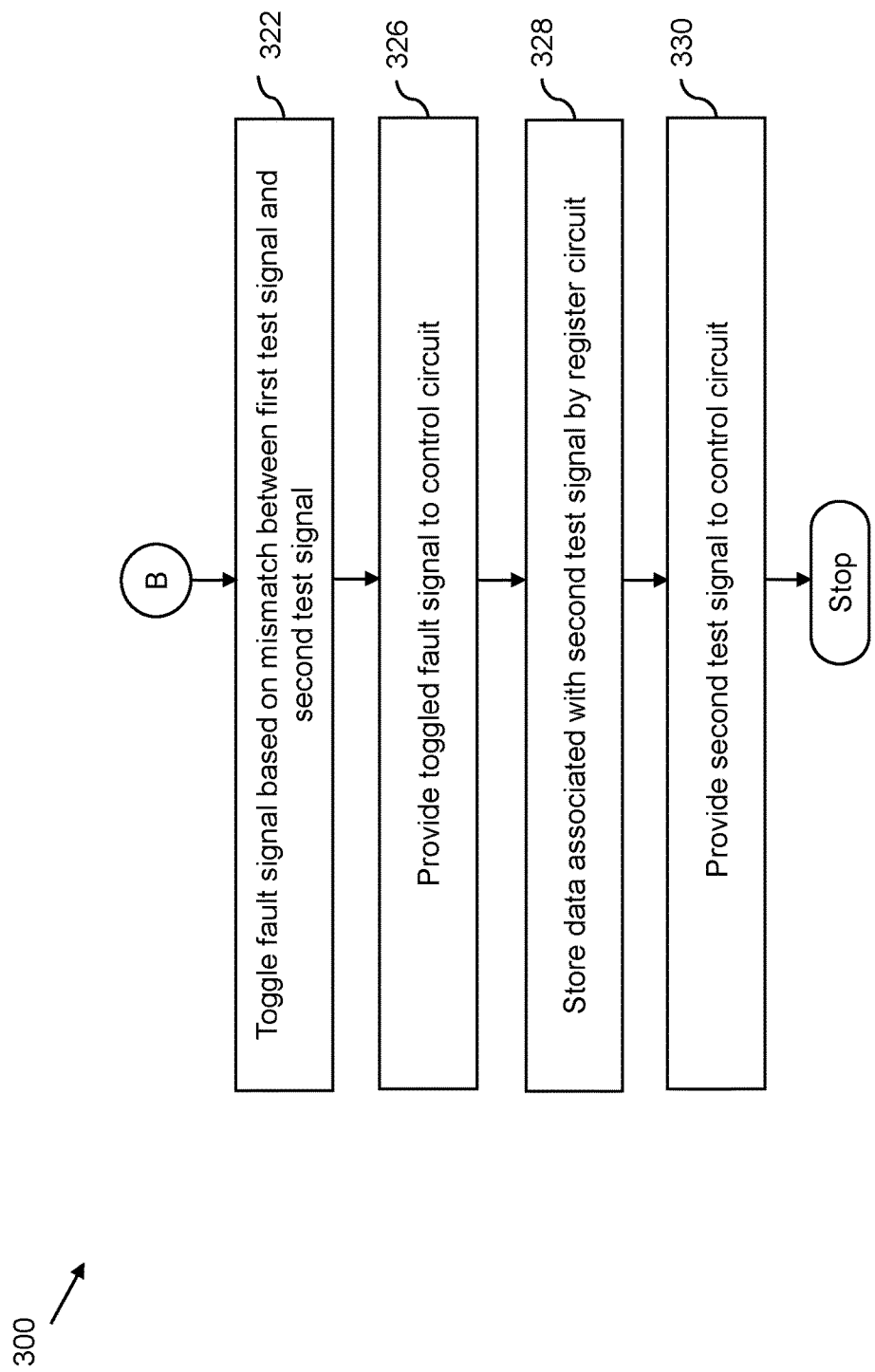

FIGS. 3A-3C represents a flowchart 300 that illustrates a validation method to validate the critical path 106 of the electronic device 100 in accordance with an embodiment of the present disclosure.

Referring to FIG. 3A, at step 302, the control register 122 of the register circuit 112 may receive the test data TD from the control circuit 108 of the electronic device 100. The test data TD may be indicative of the delay value associated with the critical path 106 of the electronic device 100 under normal operating conditions. At step 304, the control register 122 of the register circuit 112 may generate the plurality of setup signals S1-S2, the first enable signal E1, and the second enable signal E2 based on the test data TD. At step 308, the first flip-flop 114 may generate the first test signal T1 based on the first enable signal E1. At step 310, the first delay cell 202 of the delay circuit 116 may generate the plurality of delayed test signals D1-DN based on the first test signal T1. Each of the plurality of delayed test signals D1-DN may be a delayed version of the first test signal T1.

Referring to FIG. 3B, at step 312, the first delay cell 202 of the delay circuit 116 may output the coarse delay signal CO based on the first setup signal S1 of the plurality of setup signals S1-S2. The first setup signal S1 may be indicative of the first value of the delay value. The coarse delay signal CO is one of the first test signal T1 and a delayed test signal of one of the plurality of delayed test signals D1-DN. Based on the coarse delay signal CO, the delay output signal DO may be generated by the delay circuit 116. At step 314, the second delay cell 204 of the delay circuit 116 may generate the plurality of delayed coarse signals C1-CN by delaying the coarse delay signal CO. At step 316, the second delay cell 204 of the delay circuit 116 may output the delay output signal DO based on the second setup signal S2 of the plurality of setup signals S1-S2. The second setup signal S2 may be indicative of the second value of the delay value. At step 318, the second flip-flop 118 may generate the second test signal T2 based on the delay output signal DO. At step 320, the comparator 120 may compare the first test signal T1 and the second test signal T2 and generate the fault signal FS. The control circuit 108 may determine the status of the testing of the critical path 106 based on the fault signal FS. In one scenario, the match between the first test signal T1 and the second test signal T2 may be indicative of a normal delay associated with the critical path 106. The normal delay is within an acceptable range of the delay value. Based on a match between the first test signal T1 and the second test signal T2, the fault signal FS may remain in the same state. For the sake of simplicity of the ongoing description of the flowchart 300, FIG. 3C explains the mismatch between the first test signal T1 and the second test signal T2.

Referring FIG. 3C, at step 322, the comparator 120 may toggle the fault signal FS based on the mismatch between the first test signal T1 and the second test signal T2. The mismatch between the first test signal T1 and the second test signal T2 may be indicative of the mismatch of data associated with the first test signal T1 and the second test signal T2. Further, the mismatch may be indicative of deviation from the delay value associated with the critical path 106. At step 326, the comparator 120 may provide the toggled fault signal FS to the control circuit 108. At step 328, the status register 124 of the register circuit 112 may store the data associated with the second test signal T2. At step 330, the status register 124 of the register circuit 112 may provide the second test signal T2 to the control circuit 108. Based on the toggling of the fault signal FS and the reception of the second test signal T2, the control circuit 108 may transition from the active state to the safe state.

Thus, the technique of validating the critical path 106 of the present disclosure implements a simple design for validation by utilizing the delay circuit 116, the register circuit 112, the first flip-flop 114, and the second flip-flop 118. Further, the validation of all the critical paths of the electronic device 100 may be executed in a similar manner and eliminates the need for utilizing multiple test patterns to test a single critical path. The validation circuit 102 may be further able to test critical paths on a single IC of the electronic device 100 that are determined to be infeasible to excite by conventional testing circuits. In an embodiment, the electronic device 100 may include multiple critical paths in the vicinity of each other, and the validation circuit 102 may validate one of the critical paths (such as the critical path 106) that provides maximum delay. The validation of the critical path 106 with maximum delay in turn validates the other critical paths of the IC. Thus, multiple critical paths are validated simultaneously by the validation circuit 102. In other embodiments, the electronic device 100 may include a plurality of validation circuits to test a plurality of critical paths of the electronic device 100 that are in the vicinity of the plurality of validation circuits. The plurality of validation circuits may be on various ICs of the electronic device 100. Further, the validation circuit 102 may test the critical path 106 without interrupting the functionality of the critical path 106. Thus, the normal functionality of the electronic device 100 may remain unaffected during validation. Additionally, when the fault signal FS toggles, the electronic device 100 may transition into a safe state. In a safe state, the electronic device 100 may execute a controlled shutdown or reduced efficiency of operation involving the critical path 106 to ensure that further operations of the electronic device 100 remain unaffected. The validation circuit 102 eliminates the need for writing multiple test patterns to validate the critical path 106. Thus, validation time for validating the critical path 106 is reduced as compared to conventional testing circuits that write multiple test patterns for validating a single critical path.

In an embodiment of the present disclosure, a validation circuit of an electronic device is disclosed. The validation circuit may comprise a register circuit and a delay circuit. The register circuit may be configured to receive test data to validate a critical path of the electronic device. The test data may indicate a delay value associated with the critical path. The register circuit may be further configured to generate based on the test data, a plurality of setup signals associated with the delay value and a first enable signal. The delay circuit may be coupled to the register circuit. The delay circuit may be configured to receive, from the register circuit, the plurality of setup signals. Upon receiving the plurality of setup signals, the delay circuit may be configured with the delay value. The delay circuit may be further configured to receive a first test signal that may be generated based on the first enable signal. The delay circuit may be further configured to delay based on configuring the delay circuit with the delay value, the first test signal to output a delay output signal. A second test signal may be generated based on the delay output signal, and a mismatch between the second test signal and the first test signal may indicate a deviation from the delay value associated with the critical path.

In some embodiments, the validation circuit may further comprise a first flip-flop that may be coupled to a clock generator of the electronic device, the register circuit, and the delay circuit. The first flip-flop may comprise an input terminal, a clock terminal, and an output terminal. The input terminal may be coupled to the register circuit. The input terminal may be configured to receive the first enable signal. The clock terminal may be coupled to the clock generator. The clock terminal may be configured to receive a first clock signal. The output terminal may be coupled to the delay circuit. The output terminal may be configured to generate the first test signal.

In some embodiments, the delay circuit may comprise a first delay cell. The first delay cell may be coupled to the first flip-flop and the register circuit. The first delay cell may be configured to receive, from the register circuit, a first setup signal of the plurality of setup signals. The first setup signal may be indicative of a first value of the delay value, and upon receiving the first setup signal, the first delay cell may be configured with the first value. The first delay cell may be further configured to receive, from the output terminal of the first flip-flop, the first test signal. The first delay cell may be further configured to output, based on the first value, a coarse delay signal. The coarse delay signal may be one of the first test signal and a delayed test signal of the plurality of delayed test signals. The plurality of delayed test signals may be generated based on delaying of the first test signal.

In some embodiments, the first delay cell may comprise a plurality of coarse buffers. Each of the plurality of coarse buffers comprises an input terminal and an output terminal. The input terminal of a first coarse buffer of the plurality of coarse buffers may be coupled to the output terminal of the first flip-flop and may be configured to receive the first test signal. The input terminal of each remaining coarse buffer of the plurality of coarse buffers may be coupled to the corresponding output terminal of a preceding coarse buffer of the plurality of coarse buffers. Each of the plurality of coarse buffers may be configured to generate a corresponding delayed test signal of the plurality of delayed test signals.

In some embodiments, the first delay cell may further comprise a first programmable circuit. The first programmable circuit may comprise a first plurality of input terminals, a first select terminal, and an output terminal. A first input terminal of the first plurality of input terminals may be coupled to the output terminal of the first flip-flop. The first input terminal of the first plurality of input terminals may be configured to receive the first test signal. Each remaining input terminal of the first plurality of input terminals may be coupled to the output terminal of one of the plurality of coarse buffers. Each of the remaining plurality of first input terminals may be configured to receive one of the plurality of delayed test signals. The first select terminal may be coupled to the register circuit. The first select terminal may be configured to receive the first setup signal. The first select terminal may be further configured to select one of the first test signal and the delayed test signal of the plurality of delayed test signals based on the first value. The output terminal may be configured to output the coarse delay signal based on the selection of one of the first test signal and the delayed test signal.

In some embodiments, the delay circuit may further comprise a second delay cell that may be coupled to the first delay cell and the register circuit, and the second delay cell may be configured to receive, from the register circuit, a second setup signal of the plurality of setup signals. The second setup signal may be indicative of a second value of the delay value. Upon receiving the second setup signal, the second delay cell may be configured with the second value. The second delay cell may be further configured to receive, from the first delay cell, the coarse delay signal. The second delay cell may be further configured to output, based on the second value, the delay output signal. The delay output signal may be one of the coarse delay signal and a delayed coarse signal of a plurality of delayed coarse signals. The plurality of delayed coarse signals may be generated based on delaying of the coarse delay signal.

In some embodiments, the second delay cell may comprise a plurality of fine buffers. Each of the plurality of fine buffers comprises an input terminal and an output terminal. The input terminal of a first fine buffer of the plurality of fine buffers may be coupled to the first delay cell and may be configured to receive the coarse delay signal. The input terminal of each remaining fine buffer of the plurality of fine buffers may be coupled to the corresponding output terminal of a preceding fine buffer of the plurality of fine buffers. Each of the plurality of fine buffers may be configured to generate a corresponding delayed coarse signal of the plurality of delayed coarse signals.

In some embodiments, the second delay cell may further comprise a second programmable circuit. The second programmable circuit may comprise a second plurality of input terminals, a second select terminal, and an output terminal. A first input terminal of the second plurality of input terminals may be coupled to the first delay cell. The first input terminal of the second plurality of input terminals may be configured to receive the coarse delay signal. Each remaining input terminal of the second plurality of input terminals may be coupled to the output terminal of one of the plurality of fine buffers. Each of the remaining input terminals of the second plurality of input terminals may be configured to receive one of the plurality of delayed coarse signals. The second select terminal may be coupled to the register circuit. The second select terminal may be configured to receive the second setup signal. The second select terminal may be further configured to select one of the coarse delay signal and the delayed coarse signal of the plurality of delayed coarse signals based on the second value. The output terminal may be configured to output the delay output signal based on one of the coarse delay signal and the delayed coarse signal.

In some embodiments, the register circuit may be further configured to generate a second enable signal based on the test data.

In some embodiments, the validation circuit may further comprise a second flip-flop. The second flip-flop may be coupled to a clock generator of the electronic device, the register circuit, and the delay circuit. The second flip-flop may comprise a first input terminal, a second input terminal, a clock terminal, and an output terminal. The first input terminal may be coupled to the register circuit. The first input terminal may be configured to receive the second enable signal. The second input terminal may be coupled to the delay circuit. The second input terminal may be configured to receive the delay output signal. The clock terminal may be coupled to the clock generator. The clock terminal may be configured to receive a first clock signal. The output terminal may be configured to generate the second test signal.

In some embodiments, the register circuit may comprise a control register coupled to the delay circuit. The control register may be configured to receive the test data from a control circuit of the electronic device. The control register may be further configured to generate based on the test data, the first enable signal, a second enable signal, and the plurality of setup signals.

In some embodiments, the register circuit may comprise a status register coupled to a second flip-flop. The status register may be configured to receive, from the second flip-flop, the second test signal. The status register may be further configured to store data associated with the second test signal based on the reception of the second test signal.

In some embodiments, the validation circuit may further comprise a comparator. The comparator may be configured to receive the first test signal and the second test signal. The comparator may be further configured to compare the first test signal and the second test signal. The comparator may be further configured to generate a fault signal. The fault signal may toggle based on the mismatch between the second test signal and the first test signal.

In some embodiments, the second test signal and the fault signal may be provided to a control circuit of the electronic device, wherein the deviation from the delay value may be detected by the control circuit based on the toggling of the fault signal, and the control circuit may transition from an active state to a safe state based on the fault signal and the second test signal.

In some embodiments, a match between the second test signal and the first test signal may indicate normal delay associated with the critical path.

In some embodiments, the validation circuit may be in a vicinity of the critical path.

In some embodiments, the deviation from the delay value may be indicative of one of aging effects on the critical path and effects of process variation on the critical path.

In another embodiment of the present disclosure, a validation method may be disclosed. The validation method may comprise receiving, by a register circuit, test data to test a critical path of an electronic device. The test data may be indicative of a delay value associated with the critical path. The validation method may comprise generating, by the register circuit, based on the test data, a plurality of setup signals associated with the delay value and a first enable signal. Further, the validation method may comprise receiving, by a delay circuit, the plurality of setup signals that may be indicative of configuring the delay circuit with the delay value, and a first test signal that may be generated based on the first enable signal. The validation method may further comprise delaying, by the delay circuit, the first test signal based on the delay value to output a delay output signal. A second test signal may be generated based on the delay output signal. A mismatch between the second test signal and the first test signal may indicate a deviation from the delay value associated with the critical path.

In some embodiments, the register circuit and the delay circuit may be included in a validation circuit of the electronic device. The validation circuit may be in a vicinity of the critical path. Further, the deviation from the delay value may be indicative of one of aging effects on the critical path and effects of process variation on the critical path.

In some embodiments, a match between the second test signal and the first test signal may indicate that the delay value is in a normal range of the critical path.

While various embodiments of the present disclosure have been illustrated and described, it will be clear that the present disclosure is not limited to these embodiments only. Numerous modifications, changes, variations, substitutions, and equivalents will be apparent to those skilled in the art, without departing from the spirit and scope of the present disclosure, as described in the claims. Further, unless stated otherwise, terms such as "first" and "second" are used to arbitrarily distinguish between the elements such terms describe. Thus, these terms are not necessarily intended to indicate temporal or other prioritization of such elements.

We claim:

1. A validation circuit of an electronic device, comprising:
a register circuit configured to:
receive test data to validate a critical path of the electronic device, wherein the test data indicates a delay value associated with the critical path; and
generate based on the test data, a plurality of setup signals associated with the delay value and a first enable signal; and
a delay circuit coupled to the register circuit, wherein the delay circuit is configured to:
receive, from the register circuit, the plurality of setup signals, wherein upon receiving the plurality of setup signals, the delay circuit is configured with the delay value;
receive a first test signal that is generated based on the first enable signal; and
delay based on configuring the delay circuit with the delay value, the first test signal to output a delay output signal, wherein a second test signal is generated based on the delay output signal, and wherein a mismatch between the second test signal and the first test signal indicates a deviation from the delay value associated with the critical path;
wherein the validation circuit further comprises a comparator, and wherein the comparator is configured to:
receive the first test signal and the second test signal;
compare the first test signal and the second test signal; and
generate a fault signal, wherein the fault signal toggles based on the mismatch between the second test signal and the first test signal wherein the second test signal and the fault signal are provided to a control circuit of the electronic device, and wherein the deviation from the delay value is detected by the control circuit based on the toggling of the fault signal, and the control circuit transitions from an active state to a safe state based on the fault signal and the second test signal.

2. The validation circuit of claim 1, wherein the validation circuit further comprises a first flip-flop that is coupled to a clock generator of the electronic device, the register circuit, and the delay circuit, and wherein the first flip-flop comprises:
an input terminal coupled to the register circuit, wherein the input terminal is configured to receive the first enable signal;
a clock terminal coupled to the clock generator, wherein the clock terminal is configured to receive a first clock signal; and
an output terminal coupled to the delay circuit, wherein the output terminal is configured to generate the first test signal.

3. The validation circuit of claim 2, wherein the delay circuit comprises a first delay cell, wherein the first delay cell is coupled to the first flip-flop and the register circuit, and wherein the first delay cell is configured to:
receive, from the register circuit, a first setup signal of the plurality of setup signals, wherein the first setup signal is indicative of a first value of the delay value, and wherein upon receiving the first setup signal, the first delay cell is configured with the first value;
receive, from the output terminal of the first flip-flop, the first test signal; and
output, based on the first value, a coarse delay signal, wherein the coarse delay signal is one of the first test signal and a delayed test signal of one of a plurality of delayed test signals, and wherein the plurality of delayed test signals are generated based on delaying of the first test signal.

4. The validation circuit of claim 3, wherein the first delay cell comprises a plurality of coarse buffers, wherein each of the plurality of coarse buffers comprises an input terminal and an output terminal,
wherein the input terminal of a first coarse buffer of the plurality of coarse buffers is coupled to the output terminal of the first flip-flop and configured to receive the first test signal,
wherein the input terminal of each remaining coarse buffer of the plurality of coarse buffers is coupled to the corresponding output terminal of a preceding coarse buffer of the plurality of coarse buffers, and
wherein each of the plurality of coarse buffers is configured to generate a corresponding delayed test signal of the plurality of delayed test signals.

5. The validation circuit of claim 4, wherein the first delay cell further comprises a first programmable circuit, and wherein the first programmable circuit comprises:
a first plurality of input terminals, wherein a first input terminal of the first plurality of input terminals is coupled to the output terminal of the first flip-flop, wherein the first input terminal of the first plurality of input terminals is configured to receive the first test signal, wherein each remaining input terminal of the first plurality of input terminals is coupled to the output terminal of one of the plurality of coarse buffers, and wherein each of the remaining plurality of first input terminals is configured to receive one of the plurality of delayed test signals;
a first select terminal coupled to the register circuit, wherein the first select terminal is configured to receive the first setup signal, and wherein the first select terminal is further configured to select one of the first test signal and the delayed test signal of the plurality of delayed test signals based on the first value; and
an output terminal configured to output the coarse delay signal based on the selection of one of the first test signal and the delayed test signal.

6. The validation circuit of claim 3, wherein the delay circuit further comprises a second delay cell that is coupled to the first delay cell and the register circuit, and wherein the second delay cell is configured to:
receive, from the register circuit, a second setup signal of the plurality of setup signals, wherein the second setup signal is indicative of a second value of the delay value, and wherein upon receiving the second setup signal, the second delay cell is configured with the second value;
receive, from the first delay cell, the coarse delay signal; and
output, based on the second value, the delay output signal, wherein the delay output signal is one of the coarse delay signal and a delayed coarse signal of a plurality of delayed coarse signals, and wherein the plurality of delayed coarse signals are generated based on delaying of the coarse delay signal.

7. The validation circuit of claim 6, wherein the second delay cell comprises a plurality of fine buffers, wherein each of the plurality of fine buffers comprises an input terminal and an output terminal,
wherein the input terminal of a first fine buffer of the plurality of fine buffers is coupled to the first delay cell and configured to receive the coarse delay signal,
wherein the input terminal of each remaining fine buffer of the plurality of fine buffers is coupled to the corresponding output terminal of a preceding fine buffer of the plurality of fine buffers, and
wherein each of the plurality of fine buffers is configured to generate a corresponding delayed coarse signal of the plurality of delayed coarse signals.

8. The validation circuit of claim 7, wherein the second delay cell further comprises a second programmable circuit, and wherein the second programmable circuit comprises:
a second plurality of input terminals, wherein a first input terminal of the second plurality of input terminals is coupled to the first delay cell, wherein the first input terminal of the second plurality of input terminals is configured to receive the coarse delay signal, wherein each remaining input terminal of the second plurality of input terminals is coupled to the output terminal of one of the plurality of fine buffers, and wherein each of the remaining input terminals of the second plurality of input terminals is configured to receive one of the plurality of delayed coarse signals;
a second select terminal coupled to the register circuit, wherein the second select terminal is configured to receive the second setup signal, and wherein the second select terminal is further configured to select one of the coarse delay signal and the delayed coarse signal of the plurality of delayed coarse signals based on the second value; and
an output terminal configured to output the delay output signal based on one of the coarse delay signal and the delayed coarse signal.

9. The validation circuit of claim 1, wherein the register circuit is further configured to generate a second enable signal based on the test data.

10. The validation circuit of claim 9, further comprising a second flip-flop, wherein the second flip-flop is coupled to a clock generator of the electronic device, the register circuit, and the delay circuit, and wherein the second flip-flop comprises:
a first input terminal coupled to the register circuit, wherein the first input terminal is configured to receive the second enable signal;
a second input terminal coupled to the delay circuit, wherein the second input terminal is configured to receive the delay output signal;
a clock terminal coupled to the clock generator, wherein the clock terminal is configured to receive a first clock signal; and
an output terminal configured to generate the second test signal.

11. The validation circuit of claim 1, wherein the register circuit comprises a control register coupled to the delay circuit, and wherein the control register is configured to:
receive the test data from a control circuit of the electronic device; and
generate based on the test data, the first enable signal, a second enable signal, and the plurality of setup signals.

12. The validation circuit of claim 1, wherein the register circuit comprises a status register coupled to a second flip-flop, and wherein the status register is configured to:
receive, from the second flip-flop, the second test signal; and
store data associated with the second test signal based on the reception of the second test signal.

13. The validation circuit of claim 1, wherein a match between the second test signal and the first test signal indicates normal delay associated with the critical path.

14. The validation circuit of claim 1, wherein the validation circuit is in a vicinity of the critical path.

15. The validation circuit of claim 1, wherein the deviation from the delay value is indicative of one of aging effects on the critical path and effects of process variation on the critical path.

16. A validation method comprising:
receiving, by a register circuit, test data to test a critical path of an electronic device, wherein the test data is indicative of a delay value associated with the critical path;
generating, by the register circuit, based on the test data, a plurality of setup signals associated with the delay value and a first enable signal;
receiving, by a delay circuit, the plurality of setup signals that are indicative of configuring the delay circuit with the delay value, and a first test signal that is generated based on the first enable signal; and
delaying, by the delay circuit, the first test signal based on the delay value to output a delay output signal, wherein a second test signal is generated based on the delay output signal, and wherein a mismatch between the second test signal and the first test signal indicates a deviation from the delay value associated with the critical path;
receiving, by a comparator, the first test signal and the second test signal;
comparing, by the comparator, the first test signal and the second test signal; and
generate, by the comparator, a fault signal, wherein the fault signal toggles based on the mismatch between the second test signal and the first test signal, wherein the second test signal and the fault signal are provided to a control circuit of the electronic device, and wherein the deviation from the delay value is detected by the control circuit based on the toggling of the fault signal, and
transitioning, by the control circuit, from an active state to a safe state based on the fault signal and the second test signal.

17. The validation method of claim 16, wherein the register circuit and the delay circuit are included in a validation circuit of the electronic device, wherein the validation circuit is in a vicinity of the critical path, and wherein the deviation from the delay value is indicative of one of aging effects on the critical path and effects of process variation on the critical path.

18. The validation method of claim 16, wherein a match between the second test signal and the first test signal indicates that the delay value is in a normal range of the critical path.

* * * * *